United States Patent [19]
Lau

[11] Patent Number: 5,724,362
[45] Date of Patent: Mar. 3, 1998

[54] APPARATUS AND METHOD EMPLOYING A WINDOW RESET FOR EXCESSIVE BIT ERROR RATE ALARM DETECTION AND CLEARING

[75] Inventor: Joseph C. Lau, Shelton, Conn.

[73] Assignee: TranSwitch Corporation, Shelton, Conn.

[21] Appl. No.: 536,056

[22] Filed: Sep. 29, 1995

[51] Int. Cl.$^6$ .................................................. G06F 11/00
[52] U.S. Cl. ............................................ 371/5.1; 371/68.2
[58] Field of Search .............................. 371/5.1, 5.4, 5.5, 371/57.1, 62, 67.1, 61, 68.2; 364/265.1, 944.5; 370/17, 241, 242; 455/67.1, 67.3

[56] References Cited

U.S. PATENT DOCUMENTS

| | | | |
|---|---|---|---|
| 3,916,379 | 10/1975 | Dulaney et al. | 371/5.1 |
| 5,138,616 | 8/1992 | Wagner, Jr. et al. | 371/5.1 |
| 5,467,341 | 11/1995 | Matsukane et al. | 370/17 |
| 5,570,373 | 10/1996 | Wing | 371/5.1 |

*Primary Examiner*—Robert W. Beausoliel, Jr.
*Assistant Examiner*—Trinh L. Tu
*Attorney, Agent, or Firm*—David P. Gordon

[57] ABSTRACT

Methods and apparatus for generating and clearing an excessive bit error rate (EBER) alarm are provided and utilize a reset window algorithm. The BIP-8 bytes (e.g., B2 bytes) of incoming data blocks (each block being B frames long) of an STSn telecommunications signal are monitored in an "idle state" for code violation counts (CV). Upon receiving a data block having a code violation count meeting or exceeding a code violation count threshold (CVSET), a counter is initialized in a "crossing calculation state", and a window comprising a plurality (W) of blocks is monitored. The counter counts the number of incoming blocks in the window having a CV which meets or exceeds CVSET. If in the crossing calculation state, the count meets or exceeds its own threshold (X), an alarm state is entered and an EBER alarm is set. If not, the system returns to the "idle state". Once in the alarm state, every received block is monitored for its code violation count. The first received block with a CV count of CVCLR (code violation clear) or less initializes a clearing calculation state" which sets a clearing-counter CC. The clearing counter CC is used to count the number of incoming blocks in the window having a CV of CVCLR or less. If the CC count meets a third threshold value Y within the time window, the alarm is cleared and the system returns to the idle state. Otherwise, the system reverts to the alarm state.

27 Claims, 4 Drawing Sheets

FIG. 1

PRIOR ART

B DENOTES AN 8-BIT BYTE

FIG. 2

PRIOR ART

APPARATUS AND METHOD EMPLOYING A WINDOW RESET FOR EXCESSIVE BIT ERROR RATE ALARM DETECTION AND CLEARING

BACKGROUND OF THE INVENTION

1. Field of the Invention

The present invention relates generally to the field of telecommunications. More particularly, the present invention relates to apparatus and methods for in-service performance monitoring of high speed synchronous digital telecommunications signals.

2. State of the Art

The telecommunications network servicing the Unites States and the rest of the world is presently evolving from analog transmission to digital transmission with ever-increasing bandwidth requirements. Fiber optic cable has proved to be a valuable tool of such evolution, replacing copper cable in nearly ever application from large trunks to subscriber distribution plants. Fiber optic cable is capable of carrying much more information than copper with better noise immunity.

Figure 1:
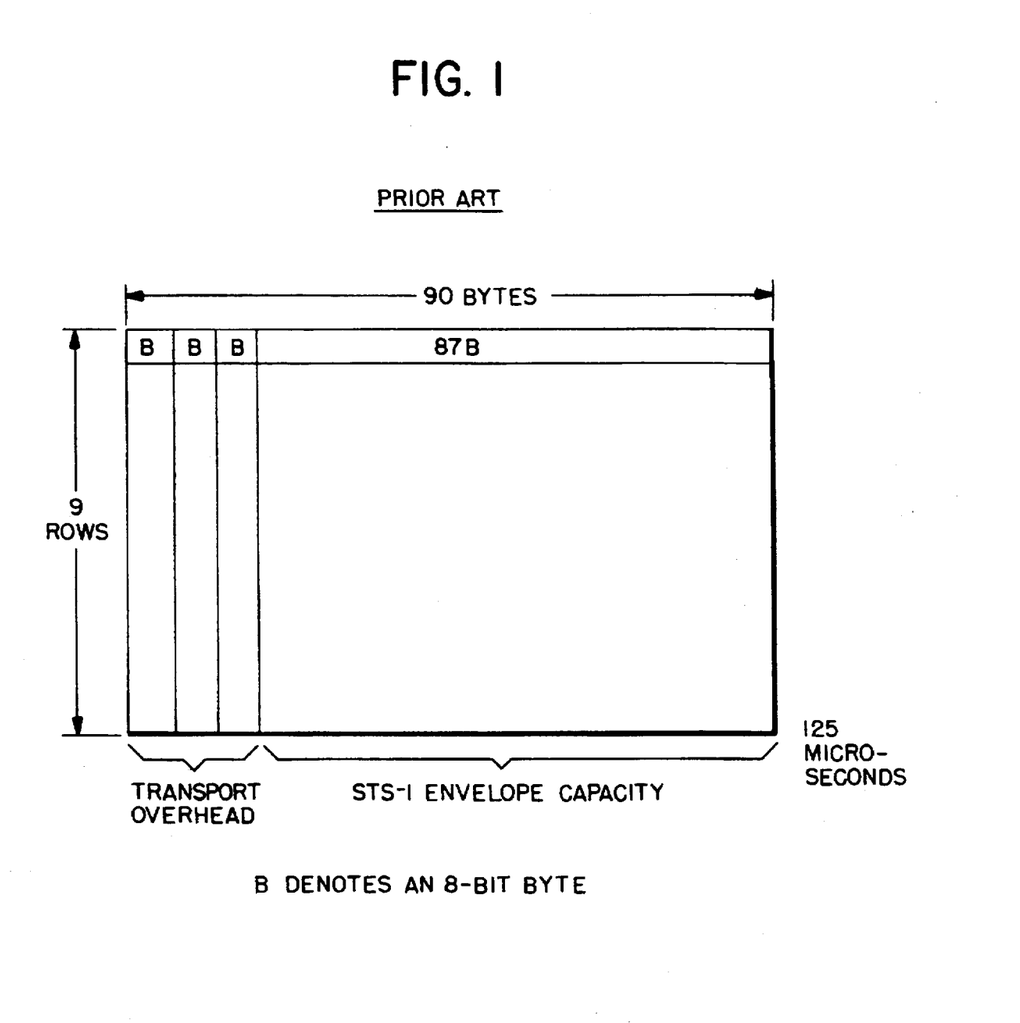
FIG. 1 is a prior art representation of the layout of a SONET STS-1 frame.
Figure 2:
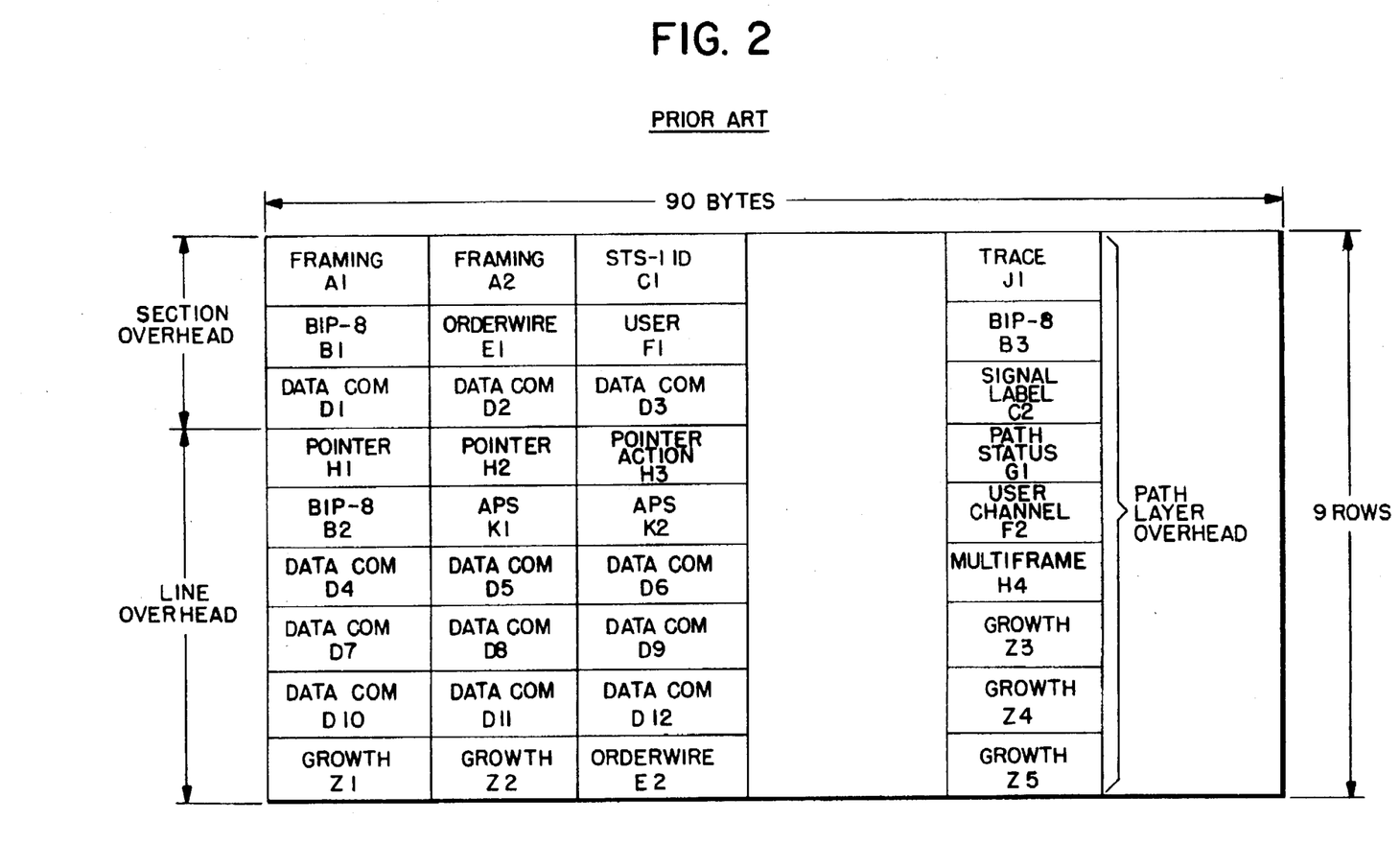
FIG. 2 is a prior art representation of specific bytes in the section, line, and path layer overhead portions of the STS-1 frame of FIG. 1.

With the advent of fiber optic communications, various standards governing the transport of data have arisen. One standard is commonly known as "SONET"; the "Synchronous Optical Network". Details regarding the SONET standard are set forth in Bellcore document TR-NWT-000253 which is hereby incorporated by reference herein in its entirety, as well as documents referenced therein. As set forth in the Bellcore documents, and as exemplified in prior art FIG. 1 which shows a SONET STS-1 frame, SONET signals are sent in a frame format which includes section overhead and line overhead which together are taken as transport overhead (TOH) arranged as columns of bytes, and a payload which are also arranged as columns of bytes. The bytes of the payload, in turn, include "path layer overhead" (POH) bytes. As seen in prior art FIG. 2 which details the TOH and POH bytes, among the TOH bytes are bytes B1 and B2 which are eight-bit interleave parity (BIP-8) codes. Similarly, the path overhead includes byte B3 which is a BIP-8 code byte.

SONET signals and SDH (Synchronous Digital Hierarchy) Signals which are closely related to SONET signals (see ITU-T Recommendations, G.707, G.708, and G.709) use the BIP-8 bytes in the transport and path overhead to monitor in-service performance. Thus, the number of received BIP-8 code violations can be converted to the bit error rate (BER) of an STS-N type signal. As set forth in Bellcore document TR-NWT-000253, a user selected BER threshold ranging from $1 \times 10^{-3}$ to $1 \times 10^{-9}$ is then used to indicate signal fail (SF) and signal degrade (SD) conditions for the initiation of an automatic protection switching (ASP). (See Section 5.3 of Bellcore TR-NWT-000253). In addition, there is a maximum detection time requirement and an average detection time objective which depend upon the chosen BER level. For example, as set forth in Table 5-2 of Bellcore TR-NWT-000253, the maximum alarm detection time for a BER of $1 \times 10^{-3}$ is 10 ms, while the maximum detection time for a BER of $1 \times 10^{-5}$ is one second. The average detection time objective for the BER of $1 \times 10^{-3}$ is 8 ms, while the average detection time objective for the BER of $1 \times 10^{-5}$ is 300/N ms or 8 ms, whichever is greater, where N is the level of the STS signal (e.g., N=1 for an STS-1 signal). The algorithm used to detect alarm conditions should also be tolerant to burst errors of up to 3 ms.

In detecting and generating alarm conditions based on the BIP-8 code violations, a sliding window algorithm (SWA) is suggested in Bellcore TR-NWT-000253. In particular, $M_f$ consecutive blocks of data are examined, where $M_f$ equals the maximum number of blocks observed before reinitialization (for alarm). If there are $m_f$ or more blocks (where $m_f$ is a desired flag count threshold number) each having m or more parity violations (where m is a parity violation count threshold) in the $M_f$ blocks, an alarm will be issued. If not, the window of the $M_f$ consecutive blocks is advanced (slid) by a single block, and the calculations are repeated for that set of $M_f$ consecutive blocks. Again, if there are $m_f$ or more blocks each having m or more parity violations, an alarm will be issued. If not, the window is again slid, and the calculations repeated.

In implementing the sliding window algorithm for a window size of N frames, the BIP-8 code violation must be checked for the current frame and the previous N-1 frames, and the previous N-1 BIP-8 code violations must be stored. The requirement of checking the BER every frame, and storing the previous N-1 BIP-8 code violations places a large strain on hardware and/or software implementing the SWA. In fact, in order to meet the BER threshold of $\times 10^{-3}$ with the detection time objective of 8 ms, only hardware or VLSI implementation is feasible. In addition, with the sliding window algorithm, the false alarm rate for declaring a signal degrade or failure is unacceptably high.

SUMMARY OF THE INVENTION

It is therefore an object of the invention to provide a method for conducting excessive bit error rate (EBER) alarm generation and clearing which is implementable in hardware or software.

It is another object of the invention to provide an EBER alarm generation and clearing algorithm which meets maximum detection time and detection time objective standards.

It is a further object of the invention to provide an EBER alarm generation and clearing algorithm which has a reduced false alarm rate relative to the sliding window algorithm.

It is an additional object of the invention to provide an EBER alarm generation and clearing algorithm which is implementable in VLSI logic with counters, registers, comparators, and logic elements.

In accord with the objects of the invention which are discussed in more detail below, the method of generating and clearing an EBER alarm broadly comprises utilizing a reset window algorithm rather than a sliding window algorithm. In particular, particular BIP-8 bytes (e.g., B2 bytes) of incoming data blocks (each block being B frames long) are monitored in an "idle state" for code violation counts (CV). Upon receiving a data block having a code violation count meeting or exceeding a code violation count threshold (CVSET), a counter is initialized in a "crossing calculation state", and a window comprising a plurality (W) of blocks (including the first block and the W-1 succeeding blocks) are monitored. The counter is used to count the number of incoming blocks in the window having a code violation count (CV) which meets or exceeds the code violation count threshold (CVSET). If in the crossing calculation state, the count (SC) meets or exceeds its own threshold (X), a BER alarm (i.e., excessive bit error rate EBER condition) or "alarm state" is declared. If not, the system returns to the "idle state" where incoming data is again monitored on a block by block basis until a block has a code violation count CV meeting or exceeding the threshold CVSET.

Once in the alarm state, every received block is monitored for its code violation count. The first received block with a CV count of CVCLR (code violation clear) or less initializes an alarm clearing check ("clearing calculation state") which sets a clearing-counter CC. In the clearing calculation state, the clearing counter CC is used to count the number of incoming blocks in the window having a code violation count (CV) of CVCLR or less. If the CC count meets a third threshold value Y within the time window, the alarm is cleared and the system returns to the idle state. Otherwise, the system reverts to the alarm state.

In accord with a preferred aspect of the invention, the number of frames B in a block, the number of blocks W in a window, and the threshold values X, Y, CVSET, and CVCLR are chosen to meet the maximum detection time, and the objective of average detection time for different bit error rates. Thus, for example, for a BER of $10^{-3}$, in order to meet a maximum detection time of 10 ms and an objective of average detection time of 8 ms, each frame may be considered a block (B=1), sixty-seven blocks may be used in a window (W=67), the code violation count threshold may be set to three code violations per block (CVSET=3), the clearing code violation threshold may be set to zero code violations per block (CVCLR=0), the threshold number of blocks in a window meeting or exceeding CVSET in order to set the alarm may be set to thirty-nine (X=39), and the threshold number of blocks in a window meeting the CVCLR threshold in order to clear the alarm may be twenty-eight (Y=28). With such an arrangement, the burst-proof requirement of 3 ms is also met. For a different BER, different values may be used. For example, for a BER of $10^{-6}$, the following values will meet the maximum detection time, and objective of average detection time: W=160, B=200, X=48, CVSET=2, Y=122, CVCLR=0.

In accord with a further aspect of the invention, a hardware or software apparatus having four or five counters, and six registers is utilized in practicing the method of the invention. In particular, the counters include a code violation counter CV for counting BIP-8 errors, a set counter SC for counting the number of blocks having CV≧CVSET, a clear counter CC for counting the number of blocks having CV≦CVCLR, a block counter BC for counting the window length W, and a frame counter FC for counting the number of frames B in a block. If desired, the set counter SC can be reused as the clear counter CC. The registers include registers for storing values for thresholds CVSET, CVCLR, X, and Y, and registers for storing values for the number of blocks W in a window, and the number of frames B in a block.

Additional objects and advantages of the invention will become apparent to those skilled in the art upon reference to the detailed description taken in conjunction with the provided figures.

DETAILED DESCRIPTION OF THE PREFERRED EMBODIMENT

Figure 3:
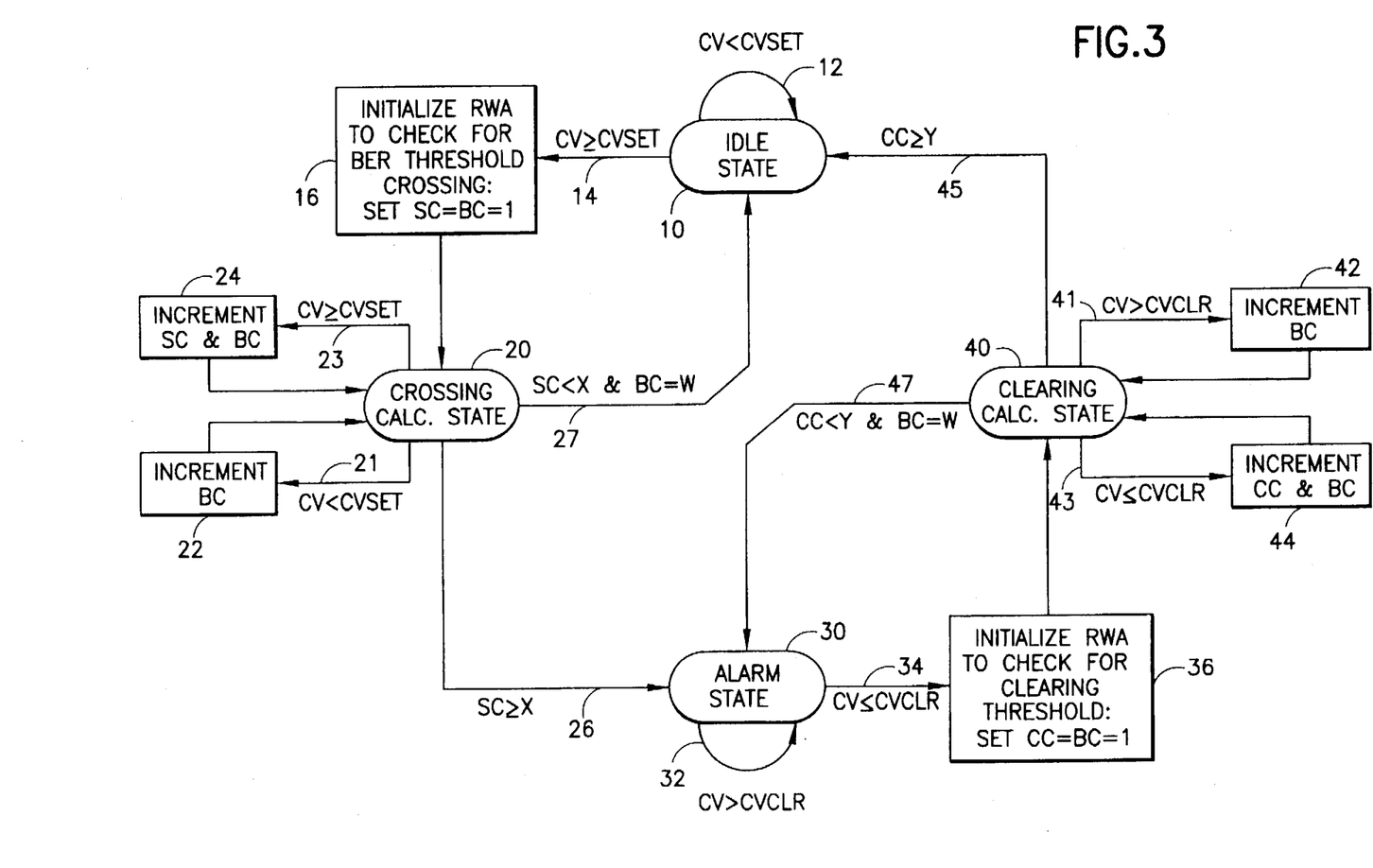
FIG. 3 is a flow chart of the reset window method of the invention for generating and clearing bit error rate alarms.

Turning now to FIG. 3, the "reset window" method of the invention for generating and clearing bit error rate alarms is seen in flow chart form. The method defines four states: an idle state 10, a crossing calculation state 20, an alarm state 30, and a clearing calculation state 40. As will be described in greater detail hereinafter, in the idle state 10, the number of code violations contained in blocks of data (each block being B frames long) are monitored on a block by block basis in order to determine whether to remain in the idle state or to move from the idle state into the crossing calculation state 20. In the crossing calculation state 20, a window containing a plurality of blocks is monitored in order to determine whether to move back to the idle state or to declare an alarm state 30 and set the EBER alarm. In the alarm state, the number of code violations are again monitored on a block by block basis in order to determine whether to remain in the alarm state or to move from the alarm state into the clearing calculation state 40. Finally, in the. clearing calculation state 40, another window of blocks is monitored in order to determine whether to return to the alarm state or to move to the idle state and clear the EBER alarm.

The method starts in the idle state 10, where no EBER alarm has been declared, or where such an alarm has been cleared. In the idle state, the BIP-8 byte(s) under surveillance (e.g., the B2 byte of the frame) are monitored such that a count is made of the number of code violations (CV) contained in each received block of data. Thus, for a given block of data, the cumulative number of code violations is determined and is compared to a predetermined value CVSET (Code Violation SET). If the number of code violations for the block is less than CVSET as indicated at 12, the method remains in the idle state, and the next block of data is analyzed for the cumulative number of code violations contained therein. However, if the number of code violations for the block is equal to or greater than CVSET as indicated at 14, two counters (the set counter SC and the block counter BC) are initialized (e.g.,, set to a value "1") at 16, and the "crossing calculation state" 20 is declared.

In the crossing calculation state 20, a window comprising a plurality (W) of successive blocks (including the block which caused movement from the idle state 10 into the crossing calculation state 20) is monitored. The block counter BC is used to track the number of blocks in the window, while the set counter SC is used to track the number of blocks containing a cumulative number of code violations greater than or equal to CVSET. Thus, while in the crossing calculation state 20, as each block of the window is analyzed for its code violations, if the number of code violations is less than CVSET for that block as indicated at 21, only the block counter BC is incremented at 22. However, if the number of code violations is greater than or equal to CVSET for that block as indicated at 23, both the set counter SC and block counter BC are incremented at 24. If the value of the set counter SC reaches (or exceeds) a threshold value X as seen at 26 prior to or upon the block counter reaching a value W (i.e., within the window of blocks, the number of blocks containing code violations greater than or equal to CVSET reaches a predetermined threshold value), the alarm state is declared at 30 (upon reaching the threshold value), and the EBER alarm is set. Otherwise, as indicated at 27, the method returns to the idle state 10 where each block is analyzed on a block by block basis to determine whether to re-enter the crossing calculation state 20.

In the alarm state 30 where a EBER alarm signal is being generated (see FIG. 4), the code violations are again analyzed on a block by block basis. Thus, if the number of code violations in a block exceeds a predetermined threshold value CVCLR (Code Violation CLeaR) as indicated at 32, the method remains in the alarm state, and the next block is analyzed. However, if the number of code violations in a block is less than or equal to the value CVCLR as indicated at 34, two counters (the "clear counter" CC and the block counter BC) are (re) initialized to a value "1" at 36, and the clearing calculation state is declared at 40.

In the clearing calculation state, a second window of the predetermined number W of blocks is analyzed to determine how many of the blocks contain code violations in excess of the threshold CVCLR. Thus, as each block is analyzed, if the code violations for that block exceeds the threshold value CVCLR as indicated at 41, only the block counter BC is incremented at 42. If the code violations for that block is equal to or less than the threshold value CVCLR as indicated at 43, both the clear counter CC and the block counter BC are incremented at 44. If the count of the clear counter meets or exceeds a predetermined threshold value Y as indicated at 45 prior to or upon the block counter BC reaching the end of the window (i.e., BC=W), the EBER alarm is cleared (upon reaching the threshold), and the method returns to the idle state. However, if the clear counter does not reach the threshold value Y prior to the end or at the end of the window (i.e., when BC=W) as indicated at 47, the method returns to the alarm state 30, and each block of data is again analyzed on a block by block basis to determine whether to exit or remain in the alarm state.

In accord with a preferred aspect of the invention, the number of frames B in a block, the number of blocks W in a window, and the threshold values X, Y, CVSET, and CVCLR may be set to meet the maximum detection time, and the objective of average detection time for different bit error rates. Accordingly, preferred threshold values, and values for parameters B and W are as set forth in Table 1:

TABLE 1

| BER | W (blocks) | B (frames) | X (blocks) | CVSET (CV/blk) | Y (blocks) | CVCLR (CV/blk) |
| --- | --- | --- | --- | --- | --- | --- |
| $10^{-3}$ | 67 | 1 | 39 | 3 | 28 | 0 |
| $10^{-4}$ | 160 | 2 | 44 | 2 | 122 | 0 |
| $10^{-5}$ | 160 | 20 | 48 | 2 | 122 | 0 |
| $10^{-6}$ | 160 | 200 | 48 | 2 | 122 | 0 |
| $10^{-7}$ | 160 | 2000 | 48 | 2 | 122 | 0 |
| $10^{-8}$ | 160 | 20000 | 48 | 2 | 122 | 0 |
| $10^{-9}$ | 160 | 200000 | 48 | 2 | 122 | 0 |

With the values as shown, where the BER threshold of $10^{-3}$ is desired, the maximum detection time will be equal to the length of the window of sixty-seven frames; i.e., 67×125 μsec=8.375 ms, which is less than the maximum detection time requirement of 10 ms for that BER threshold. Likewise, the minimum detection time will be thirty-nine frames= 4.875 ms (which is more than the burst-proof requirement). Thus, the objective of average detection time of 8 ms for that BER threshold will likewise be met.

Figure 4:
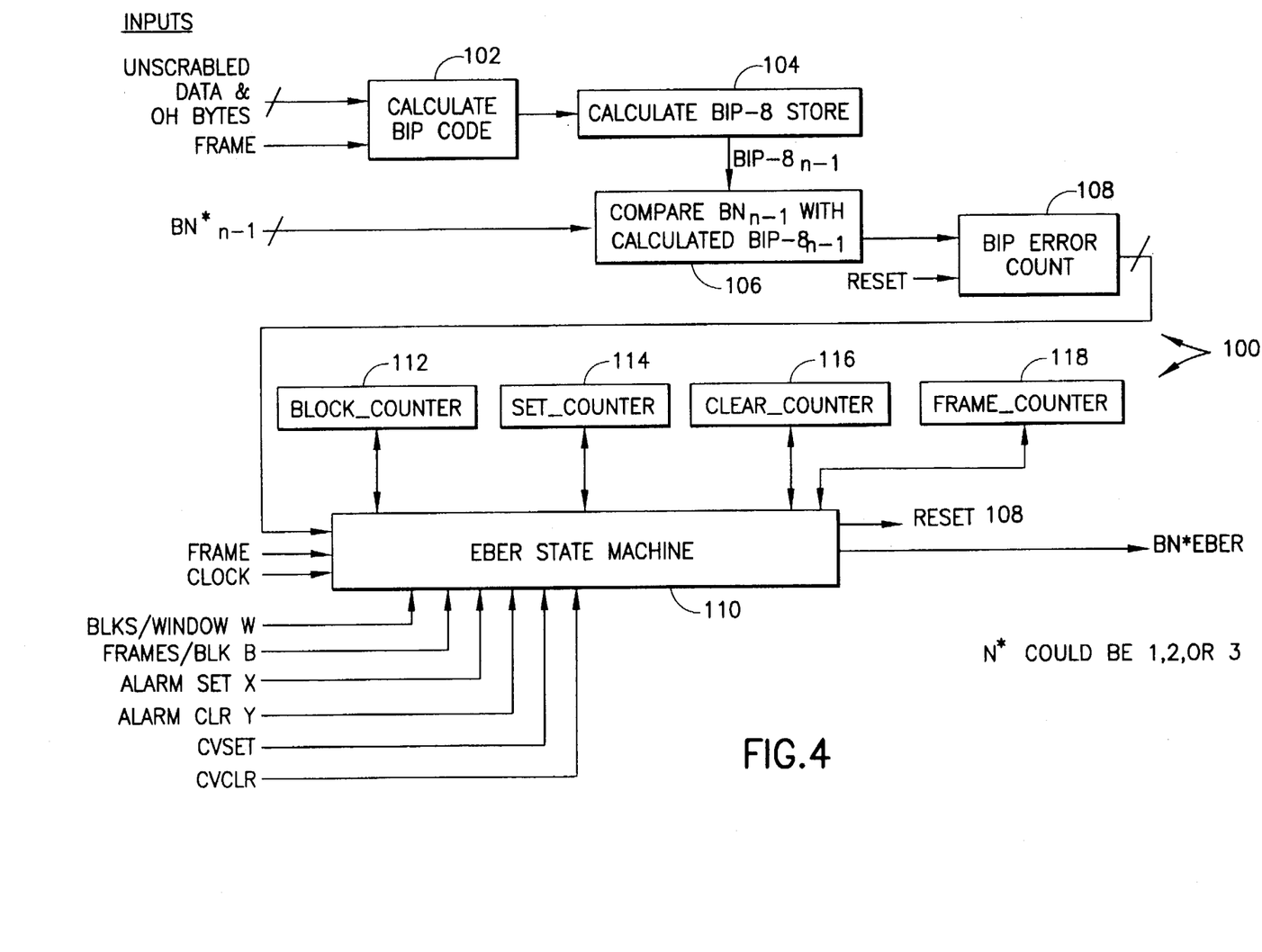
FIG. 4 is a block diagram of a VLSI apparatus which generates and clears bit error rate alarms in accord with the reset window method of the invention.

Turning to FIG. 4, a block diagram of an apparatus 100 which implements the method of the invention is seen. As will be appreciated by those skilled in the art, the BIP-8 codes contained in the B1, B2, and B3 bytes of the STSn signal frame are parity bytes of different portions of the previous frame. It will also be appreciated that in obtaining a bit error (code violation) count, it is necessary to calculate from the incoming free, the BIP code value for the frame that was received, and then compare that value to the BIP-8 value received in the next frame. Therefore, as shown in FIG. 4, using a frame synch signal as well as the unscrambled bytes of interest as inputs, the BIP-8 code for the desired byte (e.g., B2) is calculated by block 102, and stored in buffer 104 so that it can be compared by a comparator 106 to the BIP-8 code received in the next frame. The comparison carried out by the comparator can yield anywhere between zero and eight code violation errors (CV). In accord with the invention, the BIP-8 error count (CV) is accumulated in an accumulator or counter 108 for each block of data being received. Thus, where the block of data is only a single frame, the accumulator 108 which receives the BIP-8 error count determined by comparator 106 is reset each frame after it provides it results to the EBER state machine 110. However, where the block of data includes a plurality of frees, the BIP-8 error count is accumulated in accumulator 108 until the block of data is finished. Only after the block of data is finished, and the results are provided to the state machine 110 is the accumulator reset.

The accumulated BIP-8 error count CV is only one of several values which are provided to the EBER state machine 110 (although it is the only regularly changed variable). The other values include register values for the thresholds CVSET, CVCLR, X, and Y, and register values which indicate the number of blocks W in a window, and the number of frees B in a block. In addition, a frame signal and a clock signal are provided to the state machine 110. Associated with the EBER state machine 110 are four counters: a block counter (BC) 112, a set counter (SC) 114, a clear counter (CC) 116, and a frame counter (FC) 118.

The EBER state machine 110 is a state machine which is preferably implemented in VLSI hardware, although it may be implemented in either software or other hardware. Regardless of how implemented, the functioning of the state machine is governed according to the flow chart of FIG. 3. Likewise, it should be appreciated that the counters 112, 114, 116, and 118, as well as the BIP-8 calculation block 102, the buffer 104, the comparator 106, and the accumulator 108 may also be implemented in hardware or software. Further, the inputs CVSET, CVCLR, X, Y, W, and B to the state machine 110 may implemented as values stored in hardware registers or in software. If desired, the set counter 114 and clear counter 116 can be implemented as a single counter, as the set and clearing functions are never utilized at the same time; i.e., counters 114 and 116 will never be active together.

With the method and apparatus as provided, the user is preferably permitted to set the bit error rate threshold at which an alarm will be generated. Thus, the user preferably defines values for the parameters B, W, X, Y, CVSET, and CVCLR, with preferred values set forth above in Table 1. With the parameter values set, as bytes of the STSn signal are received, they are used to calculate a BIP-8 value for that frame. The calculated BIP-8 value is then compared to the received corresponding BIP-8 value of the next frame in order to determine a BIP error count. Because the method of the invention requires that the BIP error count be compared to the threshold CVSET on a block by block basis, where a block is comprised of more than one frame, the frame counter 118 is updated every frame, and is used to track the start (or end) of each block (i.e., the count of the frame counter 118 is compared to the EBER state machine input value B). Thus, as indicated in FIG. 4, the EBER state machine 110 outputs a reset Signal to the BIP error counter 108 based on the count of the frame counter 118. However, until reset, the BIP error counter 108 accumulates the BIP error count for the block. If the state machine 110 determines that the count of counter 108 exceeds the threshold value CVSET, the block counter 112, and set counter 114 are preferably initialized to a value "1". The apparatus, including the state machine, then continues to function as previously described, but in the crossing calculation state.

In the crossing calculation state, not only does the frame counter keep track of the blocks in order to reset the BIP-8 error counter 108, but the block counter 112 is incremented after each block and compared to the value W in order to determine whether the window has been completed. Furthermore, the set counter 114 which is incremented each block where the BIP-8 error count CV exceeds the threshold CVSET, is compared to the alarm set threshold value X. Depending upon the value of the set counter (as compared to X), the state machine may either move into the alarm state and output an alarm BN*EBER, or, upon completion of the window W, may move back to the idle state.

In the alarm state, the EBER state machine functions in a manner similar to the idle state, except that the accumulated BIP error count CV is now compared to the threshold value CVCLR instead of CVSET, and the EBER alarm is being output. In the alarm state, if the state machine 110 determines that the count of counter 108 is less than or equals the threshold value CVCLR, the block counter 112, and clear counter 116 are preferably initialized to a value "1". The apparatus, including the state machine, then continues to function as previously described, but in the clearing calculation state.

In the clearing calculation state, not only does the frame counter keep track of the blocks in order to reset the BIP error counter 108, but the block counter 112 is incremented after each block and compared to the value W in order to determine whether the window has been completed. Furthermore, the clear counter 114 which is incremented each block where the BIP error count CV equals or is less than the threshold CVCLR, is compared to the alarm clear threshold value Y. Depending upon the value of the clear counter 114 (as compared to Y), the state machine may move to the idle state and clear the EBER alarm, or, upon the completion of the window, the state machine may move back into the alarm state.

It should be appreciated that in both the crossing calculation state and the clearing calculation state, a determination as to whether to move (or return) to the idle state or to the alarm state is made based on the information from a single window. After a decision is made, and the state is changed to the idle state or the alarm state, a determination as to whether to enter the crossing calculation state or clearing calculation state from the idle state or alarm state is made on a block by block basis. If the crossing or clearing calculation state is re-entered, a completely new time window is established which does not overlap with the previous time window. Thus, the apparatus and method of the invention effectively employ a "window reset" as opposed to a sliding window algorithm with the associated advantages as mentioned before.

It should also be appreciated that the apparatus and method of the invention can be utilized to set an alarms for any or all of the B1, B2, and B3 bytes of the SONET signal; and the SONET signal may be an STS-1, STS-3, or any other SONET signal of interest. Of course, if it desired to be able to generate more than one alarm signal, additional apparatus which is essentially identical to the apparatus shown in FIG. 4 could be utilized.

There have been described and illustrated herein an apparatus and method for detecting and clearing an excessive bit error rate alarm which utilizes a window reset algorithm. While particular embodiments of the invention have been described, it is not intended that the invention be limited thereto, as it is intended that the invention be as broad in scope as the art will allow and that the specification be read likewise. Thus, while a particular apparatus (i.e., a VLSI state machine with associated counters) has been disclosed for implementing the method, it will be appreciated that other apparatus could be utilized. For example, the apparatus could be embodied in a properly programmed very high speed microprocessor with associated memory. Also, while particular threshold values have been disclosed for determining whether to change states, it will be recognized that other threshold values could be used with similar results obtained. In addition, while the method of the invention was described as comparing the set counter to see whether it equalled or exceeded a threshold value X, and comparing the clear counter to see whether it was less than a threshold value Y, it will be appreciated that inverse function or other functions could be utilized. For example, the "set counter" could be incremented only when the BIP error count CV was less than CVSET, and the alarm set when the "set counter" was less than a predetermined value X'. Alternatively, the threshold value could be increased such that the bit error count must be greater than CVSET, rather than greater than or equal to CVSET in order to increment the set counter. Thus, what is actually required is only that a comparison be made between the BIP error count CV and a CVSET threshold value to provide an indication of excessive error in a block, and that (within a window) another comparison be made between another threshold value and an indication of the number of times excessive error was indicated.

It will also be appreciated that some of the specifics of the method can be changed within the scope of the invention. For example, rather than immediately setting or clearing the alarm upon the set counter or clear counter reaching the threshold for setting or clearing the alarm, the alarm can be set or cleared and the state changed only upon reaching the end of the window. It will therefore be appreciated by those skilled in the art that yet other modifications could be made to the provided invention without deviating from its spirit and scope as so claimed.

I claim:

1. A method for generating an excessive bit error rate (EBER) alarm for an STSn or an STMn telecommunications signal, said STSn or STMn telecommunications signal having a frame, comprising:
   a) in an idle state, monitoring blocks of the telecommunications signal to determine on a block by block basis the number of code violations (CV) in a given block, and comparing the number of code violations of each block to a first threshold value (CVSET) until an excessive bit error indication for one of said blocks is obtained, wherein a block of the telecommunications signal comprises an integer number (B) of frames of the STSn or STMn telecommunications signal, said integer being greater than zero;
   b) when said excessive bit error indication for one of said blocks is obtained,
      (i) setting a first window comprised of a first plurality of blocks (W) of the telecommunications signal,
      (ii) monitoring said blocks of said first window, and comparing the number of code violations of each block in said first window to said first threshold value to provide a first error-related indication for each block,
      (iii) counting the number of blocks in said first window where said first error-related indication is of a first type to provide a first count, and
      (iv) comparing said first count to a second threshold value (X), and entering an alarm state and setting an alarm when said first count relates to said second threshold value in a first manner, and returning to said idle state when said count relates to said second threshold value in a second manner.

2. A method according to claim 1, further comprising:

c) in said alarm state, monitoring each block of said telecommunications signal, and comparing the number of code violations of each block on a block by block basis to a third threshold value (CVCLR) until an acceptable bit error indication for a an other one of said blocks is obtained;

b) when said acceptable bit error indication for an other one of said blocks is obtained,
   (i) setting a second window comprised of a second plurality of blocks of the telecommunications signal,
   (ii) monitoring said blocks in said second window, and comparing the number of code violations of each block in said second window to said third threshold value to provide a second error-related indication for each block in said second window,
   (iii) counting the number of blocks in said second window where said second error-related indication is of a desired type to provide a second count,
   (iv) comparing said second count to a fourth threshold value, and entering said idle state and clearing said alarm when said second count relates to said fourth threshold value (Y) in one manner, and returning to said alarm state when said second count relates to said fourth threshold value in another manner.

3. A method according to claim 2, wherein:
said second plurality of blocks is equal in number to said first plurality of blocks.

4. A method according to claim 3, wherein:
said first window starts with said one of said blocks and continues with W-1 successive blocks after said one of said blocks, and
said second window starts with said other one of said one blocks, and continues with W-1 successive blocks after said other one of said blocks.

5. A method according to claim 2, wherein:
said alarm state is entered and said alarm is set at a conclusion of said first window,
said idle state is entered and said alarm is cleared at a conclusion of said second window.

6. A method according to claim 2, wherein:
said code violations are determined by calculating a BIP-8 value for predetermined bytes of data in said frame of said telecommunications signal, and comparing said BIP-8 value to a BIP-8 value received as a byte in a next frame of data of said telecommunications signal.

7. A method according to claim 6, wherein:
said byte in a next frame of data of said telecommunications signal is a B2 byte.

8. A method according to claim 2, wherein:
said excessive bit error indication for one of said blocks is obtained when a count of said code violations CV either exceeds, or exceeds or is equal to said first threshold CVSET, and
said acceptable bit error indication for an other one of said blocks is obtained when a count of said code violations CV either is less than, or equals or is less than said second threshold CVCLR.

9. A method according to claim 8, wherein:
said first error-related indication for each block is obtained when a count of said code violations CV either exceeds, or exceeds or is equal to said first threshold CVSET,
said alarm state is entered and said alarm is set when said first count either exceeds, or exceeds or is equal to said second threshold X,
said second error-related indication for each block is obtained when a count of said code violations CV either is less than, or is less than or is equal to said second third threshold CVCLR, and
said alarm is cleared when said second count either exceeds, or exceeds or is equal to said fourth threshold Y.

10. A method according to claim 1, wherein:
said first window starts with said one of said blocks, and continues with W-1 successive blocks.

11. A method according to claim 1, wherein:
said code violations are determined by calculating a BIP-8 value for predetermined bytes of data in said frame of said telecommunications signal, and comparing said BIP-8 value to a BIP-8 value received as a byte in a next frame of data of said telecommunications signal.

12. A method according to claim 11, wherein:
said byte in a next frame of data of said telecommunications signal is a B2 byte.

13. A method according to claim 1, wherein:
said excessive bit error indication for one of said blocks is obtained when a count of said code violations CV either exceeds, or exceeds or is equal to said first threshold CVSET.

14. A method according to claim 13, wherein
said first error-related indication for each block is obtained when a count of said code violations CV either exceeds, or exceeds or is equal to said first threshold CVSET, and
said alarm state is entered and said alarm is set when said first count either exceeds, or exceeds or is equal to said second threshold X.

15. A method according to claim 1, wherein:
said integer number B, said plurality W of blocks, said first threshold value CVSET, and said second threshold value X are chosen to meet a maximum detection time, and an objective of average detection time for a particular bit error rate.

16. A method according to claim 15, wherein:
said integer number B is 1, said plurality W is 67, said first threshold value CVSET is 3, and said second threshold value X is 39.

17. A method according to claim 16, wherein:
said third threshold CVCLR is 0, and said fourth threshold Y is 28.

18. A method according to claim 15, wherein:
said integer number B is 2, said plurality W is 160, said first threshold value CVSET is 2, and said second threshold value X is 44.

19. A method according to claim 18, wherein:
said third threshold CVCLR is 0, and said fourth threshold Y is 122.

20. A method according to claim 15, wherein:
said integer number B is $2 \times 10^n$ where n is an integer greater than zero, said plurality W is 160, said first threshold value CVSET is 2, and said second threshold value X is 48.

21. A method according to claim 20, wherein:
said third threshold CVCLR is 0, and said fourth threshold Y is 122.

22. An apparatus for generating an excessive bit error rate (EBER) alarm for an STSn or an STMn telecommunications signal, the STSn or STMn telecommunications signal having a frame, comprising:

a) code violation determining means for monitoring blocks of said telecommunications signal to determine on a block by block basis the number of code violations (CV) in a given block, wherein a block of said telecommunications signal comprises an integer number (B) of frames of said telecommunications signal, said integer being greater than zero;

b) state machine means for,
   (i) in a first state, comparing the number of code violations of each block to a first threshold value (CVSET), and entering a second state when said comparing provides an excessive bit error indication for one of said blocks,
   (ii) in said second state, setting a first window comprised of a plurality of blocks (W) of the telecommunications signal, comparing the number of code violations of each block of said first window to said first threshold value to provide a first error-related indication for each block, counting the number of blocks in said first window where said first error-related indication is of a first type to provide a first count, comparing said first count to a second threshold value (X), and entering a third state and setting an alarm when said first count relates to said second threshold value in a first manner, and returning to said first state when said count relates to said second threshold value in a second manner.

23. An apparatus according to claim 22, wherein:

said state machine means further comprises,
   (iii) in said third state, comparing the number of code violations of each block to a third threshold value (CVCLR), and entering a fourth state when said comparing provides an acceptable bit error indication for an other one of said blocks, and
   (iv) in said fourth state, setting a second window comprised of a second plurality of blocks of the telecommunications signal, comparing the number of code violations of said blocks in said second window to said third threshold value to provide a second error-related indication for each block in said second window, counting the number of blocks in said second window where said second error-related indication is of a desired type to provide a second count, comparing said second count to a fourth threshold value, and entering said first state and clearing said alarm when said second count relates to said fourth threshold value (Y) in one manner, and returning to said third state when said second count relates to said fourth threshold value in another manner.

24. An apparatus according to claim 23, wherein:

said code violation determining means includes a first counting means for accumulating code violations in a block, and said state machine means includes second counting means for counting blocks in a window, and third counting means for counting said first count.

25. An apparatus according to claim 23, wherein:

said state machine means includes a first register which stores a first parameter value relating to W, a second register which stores a second parameter value relating to B, a third register which stores a third parameter value relating to X, and a fourth register which stores a fourth parameter value relating to CVSET.

26. An apparatus according to claim 23, wherein:

said code violation determining means includes a first counting means for accumulating code violations in a block, and said state machine means includes a second counting means for counting blocks in a window, and a third counting means for counting said first count and for counting said second count.

27. An apparatus according to claim 26, wherein:

said state machine means includes a first register which stores a first parameter value relating to W, a second register which stores a second parameter value relating to B, a third register which stores a third parameter value relating to X, a fourth register which stores a fourth parameter value relating to CVSET, a fifth register which stores a fifth parameter value relating to CVCLR, and a sixth register which stores a sixth parameter value relating to Y.

* * * * *